United States Patent
Fuller

(10) Patent No.: US 6,588,764 B2
(45) Date of Patent: Jul. 8, 2003

(54) SEGMENTED LABYRINTH SEAL ASSEMBLY AND METHOD

(75) Inventor: Bruce E. Fuller, Alfred Station, NY (US)

(73) Assignee: Dresser-Rand Company, Olean, NY (US)

(*) Notice: Subject to any disclaimer, the term of this patent is extended or adjusted under 35 U.S.C. 154(b) by 0 days.

(21) Appl. No.: 09/990,464

(22) Filed: Nov. 20, 2001

(65) Prior Publication Data

US 2003/0094762 A1 May 22, 2003

(51) Int. Cl.$^7$ .............................. F16J 15/16; F16J 15/54
(52) U.S. Cl. ........................ 277/547; 277/416; 277/421; 277/545; 277/546
(58) Field of Search ................................. 277/416, 421, 277/422, 545, 546, 547

(56) References Cited

U.S. PATENT DOCUMENTS

| | | | | | |
|---|---|---|---|---|---|
| 1,136,271 A | * | 4/1915 | Rhodes | ........................ | 277/546 |
| 1,547,919 A | * | 7/1925 | Huhn | ........................ | 277/545 |
| 2,279,863 A | * | 4/1942 | Downer | ........................ | 277/413 |
| 3,594,094 A | | 7/1971 | Engelke et al. | ............. | 415/111 |
| 3,610,711 A | * | 10/1971 | Mierley, Sr. | ................. | 277/422 |
| 3,625,526 A | * | 12/1971 | McCormick | ................. | 277/445 |
| 3,971,563 A | | 7/1976 | Sugimura | ..................... | 277/27 |
| 4,017,088 A | * | 4/1977 | Lerjen | ......................... | 277/416 |
| 4,579,349 A | * | 4/1986 | Pipich et al. | ................. | 277/422 |
| 4,773,817 A | | 9/1988 | Stangalini et al. | ............. | 415/48 |
| 5,161,943 A | | 11/1992 | Maier et al. | ............. | 415/170.1 |
| 5,181,308 A | * | 1/1993 | Gray et al. | .................. | 277/545 |
| 5,190,440 A | | 3/1993 | Maier et al. | ............. | 415/174.5 |
| 5,322,298 A | | 6/1994 | Maier | ........................... | 277/53 |
| 5,374,068 A | | 12/1994 | Jewett et al. | ................... | 277/1 |
| 5,395,124 A | * | 3/1995 | Brandon | ..................... | 277/413 |
| 5,403,019 A | | 4/1995 | Marshall | ...................... | 277/53 |
| 5,464,226 A | | 11/1995 | Dalton | ......................... | 277/53 |
| 5,487,549 A | | 1/1996 | Dalton et al. | .................. | 277/54 |
| 5,503,405 A | | 4/1996 | Jewett et al. | .................. | 277/53 |
| 5,632,598 A | | 5/1997 | Maier | ...................... | 415/173.5 |
| 5,810,365 A | | 9/1998 | Brandon et al. | ............ | 277/416 |
| 5,934,684 A | * | 8/1999 | Brandon et al. | ............ | 277/421 |
| 5,971,400 A | * | 10/1999 | Turnquist et al. | ........... | 277/416 |
| 6,000,701 A | | 12/1999 | Burgess | ....................... | 277/412 |
| 6,022,027 A | | 2/2000 | Chevrette et al. | ............ | 277/413 |
| 6,145,844 A | * | 11/2000 | Waggott | ...................... | 277/412 |
| 6,223,391 B1 | * | 5/2001 | Kuo | ............................ | 16/113.1 |

* cited by examiner

Primary Examiner—Anthony Knight
Assistant Examiner—Christopher Boswell
(74) Attorney, Agent, or Firm—Haynes and Boone, LLP

(57) ABSTRACT

A segmented labyrinth seal assembly and method according to which a plurality of arcuate segments extend around a rotating shaft with the shaft being engaged by a sealing portion of each segment, thus sealing against the movement of fluid in an axial direction along the shaft. An engagement member extends from one end of at least one segment and is adapted to engage the corresponding end of the adjacent segment. The engagement member is urged in a direction towards the corresponding end to apply a separation force between the ends, and the separation force is adjustable.

12 Claims, 2 Drawing Sheets

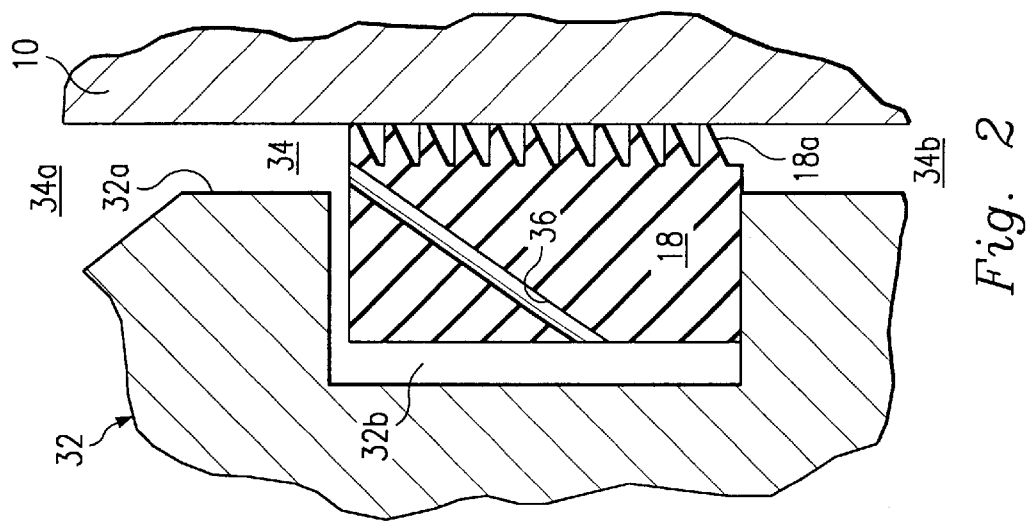
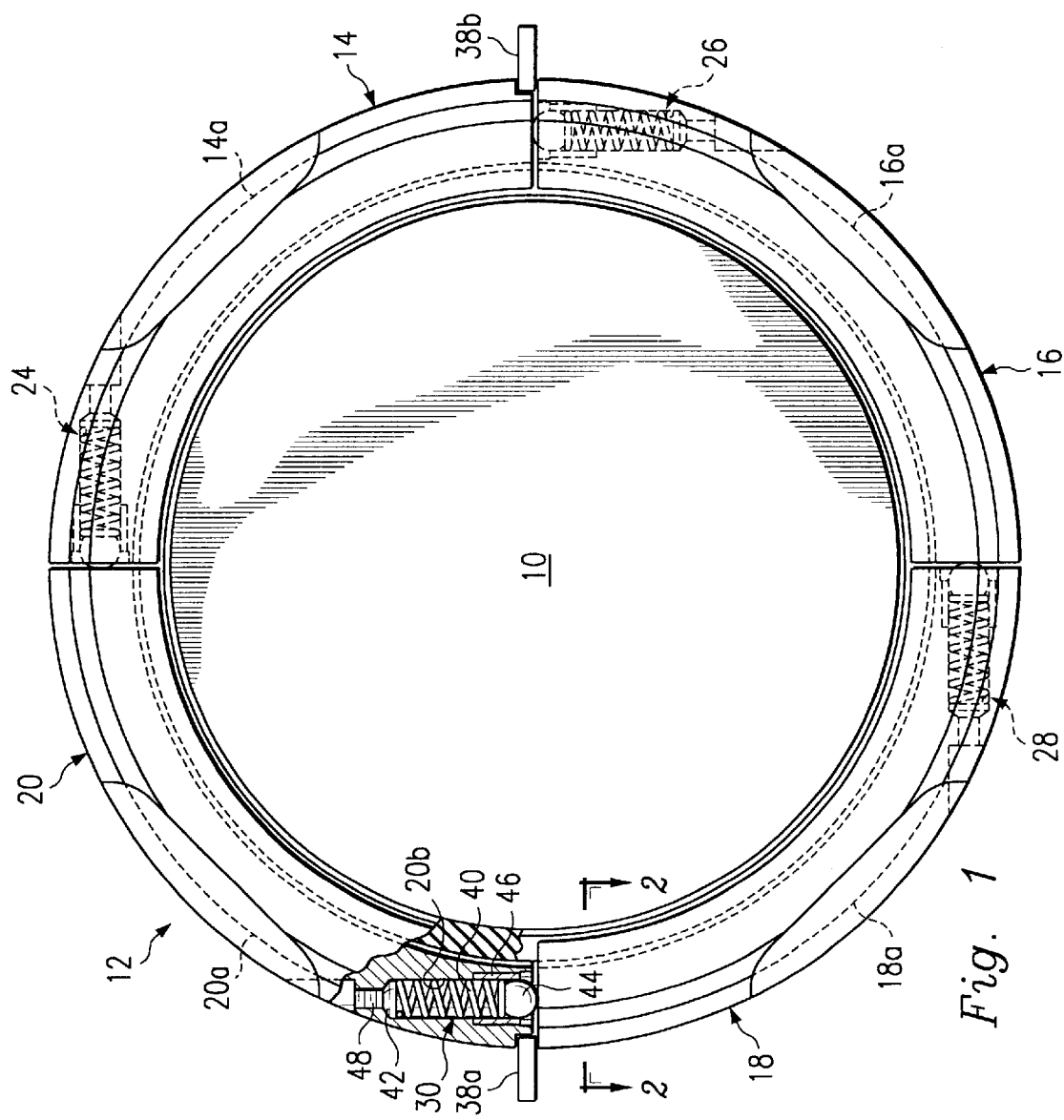

SEGMENTED LABYRINTH SEAL ASSEMBLY AND METHOD

BACKGROUND

The present disclosure relates, in general, to a seal assembly and method and, more particularly, to a segmented labyrinth seal assembly and method for sealing against the leakage of fluid.

Segmented labyrinth seal assemblies are often used to seal against the leakage of fluid in applications involving a rotating shaft that penetrates a fixed casing such as in turbo machine, centrifugal compressor, and the like. These type of seal assemblies usually include a series of arcuate labyrinth segments disposed in an end-to-end relationship and together extending around the rotating shaft with minimal clearance. The segments are adapted to expand during light loads or sudden loss of load to minimize rubbing damage caused by misalignment, vibration and thermal distortion.

However, these assemblies are often difficult to assemble, do not necessarily provide uniform loading on all segments, and are difficult or impossible to adjust.

Therefore, what is needed is a segmented seal assembly of the above type that is relatively easy to assembly, provides uniform loading on all segments of the assembly and can easily be adjusted.

DESCRIPTION OF THE DRAWINGS

FIG. 1 is a partial elevation-partial sectional view of a segmented labyrinth seal assembly according to an embodiment of the present invention.

FIG. 2 is an enlarged cross-sectional view taken along the line 2—2 of FIG. 1.

DETAILED DESCRIPTION

Figure 3:
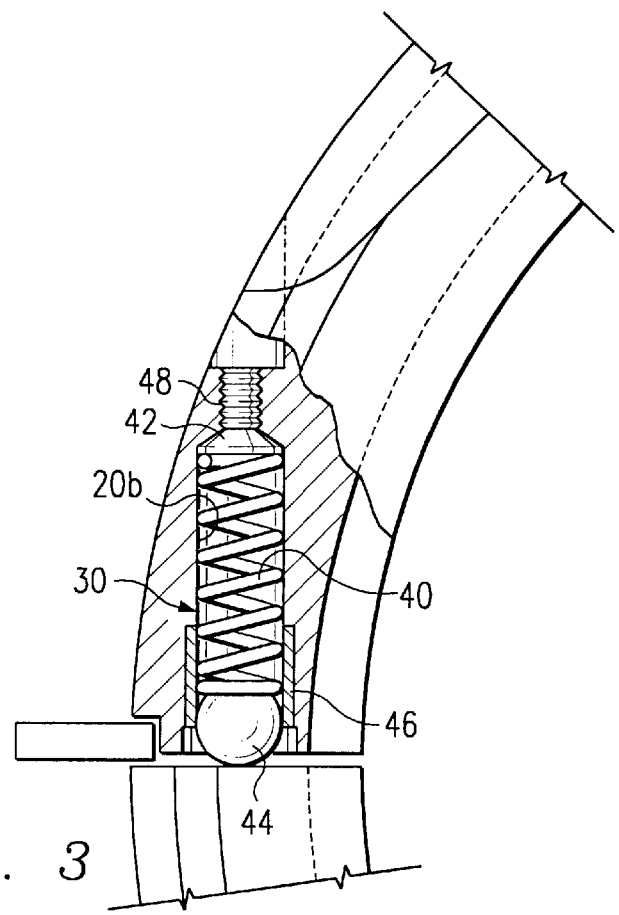
FIG. 3 is a partial cross-sectional view, depicting a component of the seal assembly of FIGS. 1 and 2.

An embodiment of the present invention is shown in FIG. 1 in connection with a shaft 10 forming a portion of a turbo machine, centrifugal compressor, or the like. An annular labyrinth seal assembly 12 extends around the shaft to seal against the leakage of fluid in an axial direction along the shaft from a high pressure area to a low pressure of the turbo machine. The seal assembly 12 consists of four arcuate segments 14, 16, 18 and 20 disposed in an end-to-end relationship with each segment extending for approximately ninety degrees to form a ring. A portion of the outer surfaces of the segments 14, 16, 18, and 20 are machined to form flat surface portions 14a, 16a, 18a, and 20a, midway between the respective ends of each segment.

A spring-loaded assembly 24 is mounted in one end portion of the segment 14 and engages the corresponding end of the segment 20; a spring-loaded assembly 26 is mounted in one end portion of the segment 16 and engages the corresponding end of the segment 14; a spring-loaded assembly 28 is mounted in one end portion of the segment 18 and engages the corresponding end of the segment 16; and a spring-loaded assembly 30 is mounted in one end portion of the segment 20 and engages the corresponding end of the segment 18. The assemblies 24, 26, 28, and 30 will be described in detail later.

With reference to FIG. 2, the seal assembly 12 is mounted in a casing 32, and although shown partially, it is understood that the casing extends completely around the shaft 10 and supports it for rotation in a conventional manner. The casing 32 has an internal cylindrical bore 32a which receives the shaft 10, and an inner annular cavity, or enlarged groove, 32b formed in the inner surface portion of the casing that defines the bore 32l, for receiving the seal assembly 12. Although FIG. 2 depicts only the seal assembly segment 18 extending in the cavity 32b, it is understood that the other segments 14, 16, and 20 also extend in other portions of the cavity.

The outer surface of the shaft 10 is radially spaced from the corresponding inner surface of the casing 32 to form an annular chamber 34. The segment 18 has an annular inside labyrinth surface 18b extending through a corresponding portion of the chamber 34 and into a sealing engagement with the outer surface of the shaft 10. The labyrinth surface 18b thus divides the chamber 34 into a relatively high pressure portion 34a located upstream of the labyrinth surface 18b and a relatively low pressure portion 34b located downstream of the labyrinth surface. In the event the casing 32 forms part of a turbo machine or a compressor, the high pressure chamber portion 34 typically would be in pressure communication with the high pressure discharge gas from the impeller (not shown) of the turbo machine or compressor.

The inner surface of the segment 18 is spaced from the inner wall of the cavity 32a to form a annular space, and a passage 36 connects the space with the chamber portion 34a. Thus, the relatively high pressure in the chamber portion 34a is transmitted to the latter space so that as the pressure increases, the segment 18, and therefore its labyrinth surface 18b, is forced into sealing engagement with the outer surface of the shaft 10. This establishes a seal against the movement of the high pressure gas in an axial direction along the shaft 10 from the chamber portion 34a to the chamber portion 34b.

It is understood that the other segments 14, 16, and 20 of the seal assembly are identical to the segment 18, extend in the cavity 32a of the casing in the same manner, and, together with the segment 18, surround the entire outer surface of the shaft 10. Also, each of the other segments 14, 16, and 20 has a labyrinth surface that also sealing engages the outer surface of the shaft 10 in the same manner as described above.

Since the specific arrangement of the segments 14, 16, 18 and 20, the labyrinth surface 18b and the corresponding labyrinth surfaces of the segments 14, 16, and 20, as well as their engagement with the shaft 10, do not, per se, form a part of any embodiment of the present invention, they will not be described in any further detail. However, they are fully disclosed in U.S. Pat. No. 5,403,019, assigned to the present assignee, and the disclosure of this patent is incorporated by reference.

Although the casing 32 is not shown in FIG. 1 for the convenience of presentation, it is provided with two stops 38a and 38b in its upper half, which are shown in FIG. 1. The labyrinth segments 14, 16, 18, and 20 slide into the cavity 32a of the casing 30 and are retained by the stops 38a and 38b extending in corresponding grooves formed in the end portions of the segments 14 and 20.

Referring to FIGS. 1 and 3, a through bore 20b is formed through the segment 20 and extends from an outer surface of the segment to the end thereof adjacent the corresponding end of the segment 18. The spring-loaded assembly 30 is located in the bore 20b and includes a spring 40 extending in the bore between a spring plate 42 and a ball 44. A portion of the ball 44 extends outwardly from the bore 20b under the force of the spring 40, and the remaining portion of the ball rides in a retainer sleeve 46 disposed in the end portion of the bore. The spring 40 thus urges the ball 44 outwardly from the bore 20b against the corresponding end of the adjacent segment 18.

A portion of the bore 20b extending from the surface of the segment 20 is of a smaller diameter than the remaining portion of the bore to form a shoulder for receiving the spring plate 42. The smaller-diameter portion of the bore 20b is internally threaded, and an externally threaded set-screw 48 is in threaded engagement with this bore portion. Thus, rotation of the set-screw 48 causes corresponding axial movement of same in the bore 28b and thus adjusts the compression on the spring 40, and therefore the force applied by the spring to the ball 44. This creates an adjustable separation force between the end of the segment 20 and the corresponding end of the segment 18.

The connection assemblies 24, 26 and 28 are identical to the assembly 30 and are mounted in the seal assembly segments 14, 16, and 18, respectively, in an identical manner.

In operation, the set-screw 48 is adjusted to apply a predetermined separation force between the segments 18 and 20 as discussed above, and the set-screws associated with the segments 14, 16, and 20 are adjusted in the same manner. Thus, the segments 14, 16, 18, and 20 are spring loaded into a slightly expanded position, with the corresponding ends of adjacent segments being in a slightly spaced condition, as shown in FIG. 1. As the pressure in the chamber portion 34a pressure increases, the labyrinth surface 18a of the segment 18, as well as the labyrinth surfaces of the segments 14, 16, and 20 will be forced into a sealing engagement with the shaft 10 as described above.

The seal assembly 10 has several advantages. For example, it is relatively easy to assemble, provides uniform loading on all segments of the assembly and can easily be adjusted. Also, the flat surface portions 14a, 16a, 18a, and 20a make the segments 14, 16, 18, and 20, respectively, more stable when retracted and ensures that the upstream pressurized steam gets into the cavity 32a and into the annular space between the inner wall of the cavity and the corresponding outer surface of each segment 14, 16, 18, and 20.

Figure 4:
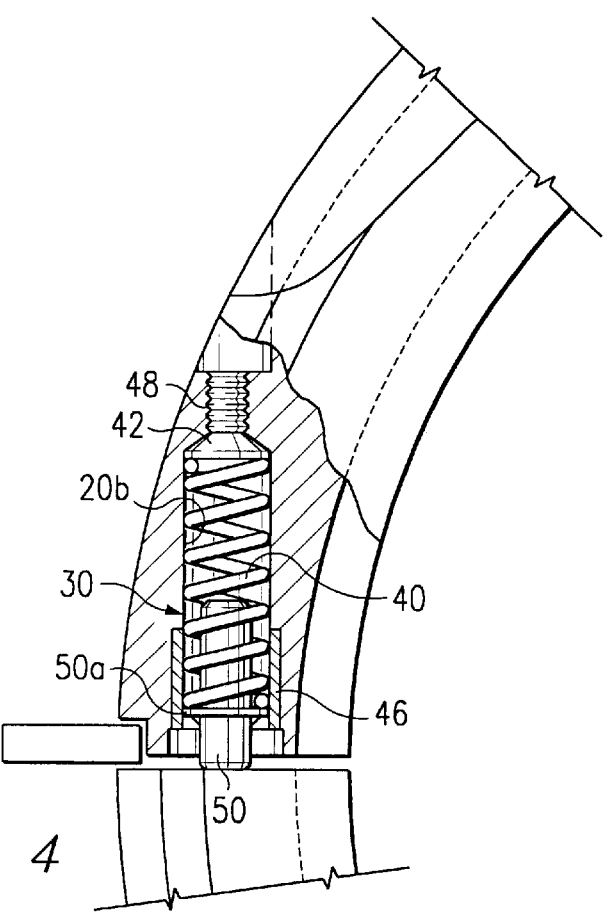
FIG. 4 is a view, similar to FIG. 3 but depicting an alternate embodiment of the component of FIG. 3.

According to the embodiment of FIG. 4 the ball 44 of the previous embodiment is replaced by a solid cylindrical plunger 50. Since the remaining components of the embodiment of FIG. 4 are identical to the embodiment of FIGS. 1–3, they are referred to by the same reference numerals.

An annular flange 50 is formed on the plunger near one end thereof which receives the corresponding end of the spring 40. A portion of the plunger 50 extends outwardly from the bore 20b under the force of the spring 40, and the spring extends around another portion of the plunger in the bore 20b. The spring 40 thus urges the plunger 50 outwardly from the bore 20b against the corresponding end of the adjacent segment 18. It is understood that a plunger, identical to the plunger 50, are provided on the connection assemblies 24, 26 and 28 and function in an identical manner. The embodiment of FIG. 4 thus enjoys all of the advantages of the embodiment of FIGS. 1–3.

It is understood that several variations may be made in the foregoing without departing from the scope of the invention. For example, number of segments forming the ring around the shaft can vary within the scope of the invention. Also, the spatial references, such as "above", etc. is for the purpose of example only, are not intended to limit the structure disclosed to a particular orientation. Moreover, the embodiment described above is not limited to turbo machines or compressors, but is equally applicable to other equipment requiring a seal.

Other modifications, changes and substitutions are intended in the foregoing disclosure and in some instances some features of the disclosure will be employed without a corresponding use of other features. Accordingly, it is appropriate that the appended claims be construed broadly and in a manner consistent with the scope of the disclosure.

What is claimed is:

1. An assembly for sealing around a rotating shaft, the assembly comprising a casing extending around the shaft, a plurality of arcuate segments disposed in the casing and between the casing and the shaft, each segment having a sealing portion extending from the casing and adapted to engage the shaft for sealing against the movement of fluid in an axial direction along the shaft, a bore formed in at least one end portion of at least one segment, a spring disposed in the bore, and an engagement member having a portion extending in the bore in engagement with the spring and another portion projecting from the bore, the spring urging the engagement member against the corresponding end of the adjacent segment to apply a separation force between the segments.

2. The assembly of claim 1 further comprising means for adjusting the force applied by the spring to the engagement member, and therefore the separation force.

3. The assembly of claim 2 wherein a portion of the bore is internally threaded and wherein the force adjusting means is in the form of a externally threaded set-screw in threaded engagement with the threaded bore portion, so that rotation of the set-screw varies the compression of the spring and therefore the separation force.

4. The assembly of claim 3 wherein the separation force between each segment can be adjusted to apply uniform loading on all of the segments and align the segments around the shaft.

5. The assembly of claim 1 wherein the engagement member is in the form of a bail.

6. The assembly of claim 1 wherein the engagement member is in the form of a plunger.

7. The assembly of claim 1 wherein there are four segments, each extending for approximately ninety degrees to form a ring extending around the shaft.

8. The assembly of claim 1 wherein a bore is provided in each end portion of each segment, a spring is disposed in each bore, and an engagement member is partially disposed in each bore in engagement with its corresponding spring.

9. The assembly of claim 8 wherein each spring urges its corresponding engagement member against the corresponding end of the adjacent segment to apply a separation force between all of the segments.

10. The assembly of claim 1 wherein the segments seal against the leakage of a relatively high pressure fluid from a high pressure area in an upstream area relative to the shaft to a relatively low pressure area In an downstream area relative to the shaft.

11. The assembly of claim 10 further comprising means for transmitting the fluid pressure from the high pressure area to the radial outer surfaces of the segments for applying a corresponding sealing force, via the segments, to the shaft.

12. The assembly of claim 11 wherein an outer surface portion of each segment is machined to form a flat surface portion to facilitate the transmission of the fluid pressure from the high pressure area to an the radial outer surfaces of the segments.

* * * * *